(12) United States Patent
Rupnow et al.

(10) Patent No.: US 12,216,557 B2
(45) Date of Patent: Feb. 4, 2025

(54) EARLY BOOT DEBUGGING OF HARDWARE ISSUES IN A COMPUTING SYSTEM

(71) Applicant: Google LLC, Mountain View, CA (US)

(72) Inventors: Kyle John Rupnow, Wheeling, IL (US); Gopi Krishna Tummala, San Jose, CA (US); Kang Yang, Campbell, CA (US); Ivan Hugh Mclean, Solana Beach, CA (US); Baranidharan Muthukumaran, Mountain View, CA (US); Edwin Jose, San Diego, CA (US)

(73) Assignee: Google LLC, Mountain View, CA (US)

( * ) Notice: Subject to any disclaimer, the term of this patent is extended or adjusted under 35 U.S.C. 154(b) by 97 days.

(21) Appl. No.: 18/182,085

(22) Filed: Mar. 10, 2023

(65) Prior Publication Data

US 2023/0205655 A1 Jun. 29, 2023

Related U.S. Application Data

(60) Provisional application No. 63/489,338, filed on Mar. 9, 2023.

(51) Int. Cl.
| | | |
|---|---|---|
| *G06F 15/177* | (2006.01) | |
| *G06F 9/00* | (2018.01) | |
| *G06F 11/22* | (2006.01) | |
| *G06F 21/57* | (2013.01) | |

(52) U.S. Cl.
CPC ........ *G06F 11/2289* (2013.01); *G06F 21/575* (2013.01)

(58) Field of Classification Search
CPC . G06F 11/2289; G06F 21/575; G06F 11/2284
See application file for complete search history.

(56) References Cited

U.S. PATENT DOCUMENTS

| 9,230,112 | B1 | 1/2016 | Peterson et al. | |
|---|---|---|---|---|
| 2015/0161408 | A1 | 6/2015 | Shanbhogue et al. | |
| 2015/0226795 | A1* | 8/2015 | Hopkins | G06F 11/3648 714/726 |
| 2017/0176522 | A1* | 6/2017 | Kuo | G01R 31/31701 |
| 2018/0067794 | A1* | 3/2018 | Datta | G06F 11/2215 |
| 2020/0334045 | A1* | 10/2020 | Chaiken | G06F 21/575 |
| 2022/0027519 | A1* | 1/2022 | Kataria | G06F 21/71 |
| 2022/0113353 | A1* | 4/2022 | Nelson | G01R 31/2839 |
| 2023/0188326 | A1* | 6/2023 | Lee | H04L 9/0825 |
| 2023/0418946 | A1* | 12/2023 | Lin | G06F 21/572 |

OTHER PUBLICATIONS

Woo, et al., "A Secure Scan Architecture Protecting Scan Test and Scan Dump Using Skew-Based Lock and Key", Jul. 2021, 16 pages.

* cited by examiner

*Primary Examiner* — Xuxing Chen
(74) *Attorney, Agent, or Firm* — Colby Nipper PLLC (57) ABSTRACT

This document describes apparatuses and techniques for enabling a user to authorize access to early boot debugging of hardware issues in a computing system. In general, responsive to a user consenting to early boot debugging, a debug reenable signal is set in nonvolatile storage. Upon reinitialization of the computing system and receipt of an early debugging request, if the debug reenable signal is detected and the early debugging request is authenticated, an early boot debugging system is enabled. The user consent to early boot debugging may circumvent the setting of a fuse that otherwise would prevent performance of early boot debugging.

20 Claims, 8 Drawing Sheets

EARLY BOOT DEBUGGING OF HARDWARE ISSUES IN A COMPUTING SYSTEM

INCORPORATION BY REFERENCE

This application claims priority to U.S. Provisional Application Ser. No. 63/489,338, filed on Mar. 9, 2023, the disclosure of which is incorporated herein by reference in its entirety.

SUMMARY

This document describes apparatuses and techniques for enabling a user to authorize access to early boot debugging of hardware issues in a computing system. In general, responsive to a user consenting to early boot debugging, a debug reenable signal is set in nonvolatile storage. Upon reinitialization of the computing system and receipt of an early debugging request, if the debug reenable signal is detected and the early debugging request is authenticated, an early boot debugging system is enabled. The user consent to early boot debugging may circumvent the setting of a fuse that otherwise would prevent performance of early boot debugging.

This Summary is provided to introduce simplified concepts of apparatuses and techniques for enabling a user to authorize access to early boot debugging of hardware issues in a computing system, which are further described below in the Detailed Description and Drawings. This Summary is not intended to identify essential features of the claimed subject matter, nor is it intended for use in determining the scope of the claimed subject matter.

BRIEF DESCRIPTION OF DRAWINGS

The details of one or more aspects of apparatuses and techniques for enabling a user to authorize access to early boot debugging of hardware issues in a computing system, as described in this document with reference to the following drawings. The same numbers are used throughout the drawings to reference like features and components.

DETAILED DESCRIPTION

A semiconductor devices may be configured to enable developers, engineers, or other authorized personnel to perform early boot debugging to alter the configuration of operation of the device. Early boot debugging allows for hardware-level access to perform testing and/or make changes to the hardware system before system software is booted. Early boot debugging provides access to test and manipulate the hardware in a way that may not be possible once the operating software is booted.

Once design or configuration issues have been resolved and the system is placed in use, it may be desirable to block access to early boot debugging. Having access to the early boot debugging may also allow access to system storage and other resources without having to penetrate security provided by the operating system or other software. A third-party that can access early boot debugging thus may be able to access sensitive personal information maintained in storage, such as financial data or personal photographs. When a system-on-chip ("SoC") device or other device has been debugged and is to be placed in production, access to early boot debugging may be prevented by setting or "blowing" a fuse or performing a similar hardware manipulation to block access to an early boot debugging system incorporated in the device.

SoCs or other devices may be configured to allow early boot debugging access when a request may be authenticated to show the request is presented by an authorized source. However, allowing a party to perform early boot debugging, even when that party is an authorized party, may not satisfy all users. Some users may be distrustful of allowing anyone to access the system once those users have used the system in connection with their personal information.

This document describes apparatuses and techniques for enabling a user to authorize access to early boot debugging of hardware issues in a computing system. Enabling the user to authorize access to early boot debugging may enable early boot debugging even when a fuse or other mechanism has been permanently set to prevent early boot debugging. When the user authorizes early boot debugging, a debug reenable signal may be set in a nonvolatile storage device, such as a register, that is accessible to authorization logic. Upon reinitialization of the computing system, when authorization logic detects the debug reenable signal and receives an authenticated early boot debug request, the authorization logic enables early boot debugging to be performed. The apparatuses and techniques may have utility with SoCs or other devices for which it may be desirable to allow early boot debugging after the SoCs or other devices are made available to users if the user consents to provide access to early boot debugging.

Figure 1:
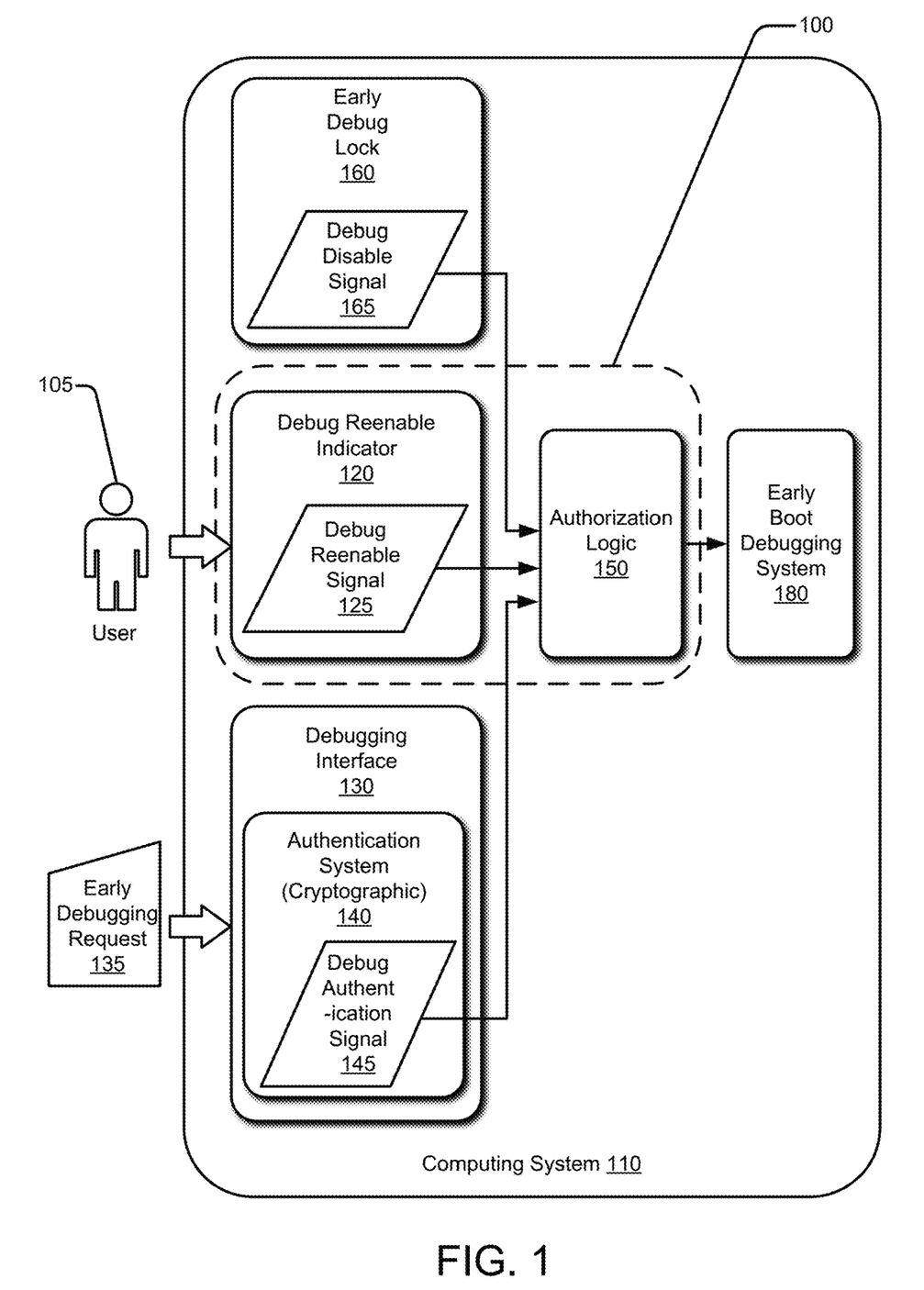
FIG. 1 is a block diagram of a system to enable early boot debugging.

FIG. 1 illustrates example details of an authorization system 100 configured to permit a user 105 (e.g., developers, engineers, or similar personnel skilled in debugging a computing system) to authorize early boot debugging in a computing system 110, such as an SoC or another computing device. In the embodiment of FIG. 1, the system 100 (e.g., an apparatus) includes a debug reenable indicator 120 configured to receive and maintain a debug reenable signal 125 when the user 105 consents to the enablement of early boot debugging. As described further below, it is termed a debug reenable signal 125 because the system 100 enables a user 105 to consent to allow early boot debugging after the computing system 110 has been configured to disable access to early boot debugging.

The debug reenable indicator 120 is communicatively coupled with authorization logic 150. The authorization logic 150 is responsive to the debug reenable signal 125 stored in the debug reenable indicator 120 and one or more other signals as further described below. The authorization logic 150 is configured to determine whether to enable an early boot debugging system 180 to permit early boot debugging based on the state of the debug reenable signal 125 and the state of other signals described below.

The authorization logic 150 is also communicatively coupled with a debugging interface 130. The debugging interface 130 is responsive to an early debugging request 135 that may be submitted by an authorized user 105. In various embodiments, the debugging interface 130 may include an authentication system 140 configured to validate or authenticate that the early debugging request 135 is received from an authorized user or another authorized source. The authentication system 140 may determine whether the early debugging request 135 includes or presents valid security credentials to warrant access to the early boot debugging system 180. The authentication system 140 may include a cryptographic authentication system to verify whether the early debugging request 135 includes valid access credentials. If the early debugging request 135 is validated by the authentication system 140, the authentication system 140 may present a debug authentication signal 145 to the authorization logic 150 to communicate the receipt of an authenticated early debugging request 135.

The authorization logic 150 also may be communicatively coupled with an early debug lock 160. The early debug lock 160 may include a fuse that may be "blown" or otherwise permanently set to disable unrestricted access to early boot debugging. The early debug lock 160 may be permanently set to present a debug disable signal 165 that may be detected by the authorization logic 150. For example, after development and initial debugging of the computing system 110, the debug disable signal 165 may be permanently set in the early debug lock 160 when the computing system 110 is intended to be delivered for use, such as by the user 105. The state of the debug disable signal 165 maintained in the early debug lock 160 may thus disable access the early boot debugging system 180, unless reenabled according to the embodiments described herein.

The authorization logic 150, in one example, may be configured to permit access to the early boot debugging system 180 based on the state of each of the debug reenable signal 125 and the state of the debug authentication signal 145 even when the debug disable signal 165 has been set to prevent access to the early boot debugging system 180. For example, when the state of the debug reenable signal 125 indicates that the user 105 has consented to providing early boot debugging access and the debug authentication signal 145 indicates that the early debugging request 135 is properly authenticated, the authorization logic 150 may enable the early boot debugging system 180 to permit early boot debugging. As further described below with reference to FIGS. 2 through 6C, the authorization logic 150 may include a range of components and/or may be configured to respond to various signals responsive to the user 105 consent and the validity of the early debugging request 135 to determine access the early boot debugging system 180 to perform early boot debugging of the computing system 110.

Figure 2:
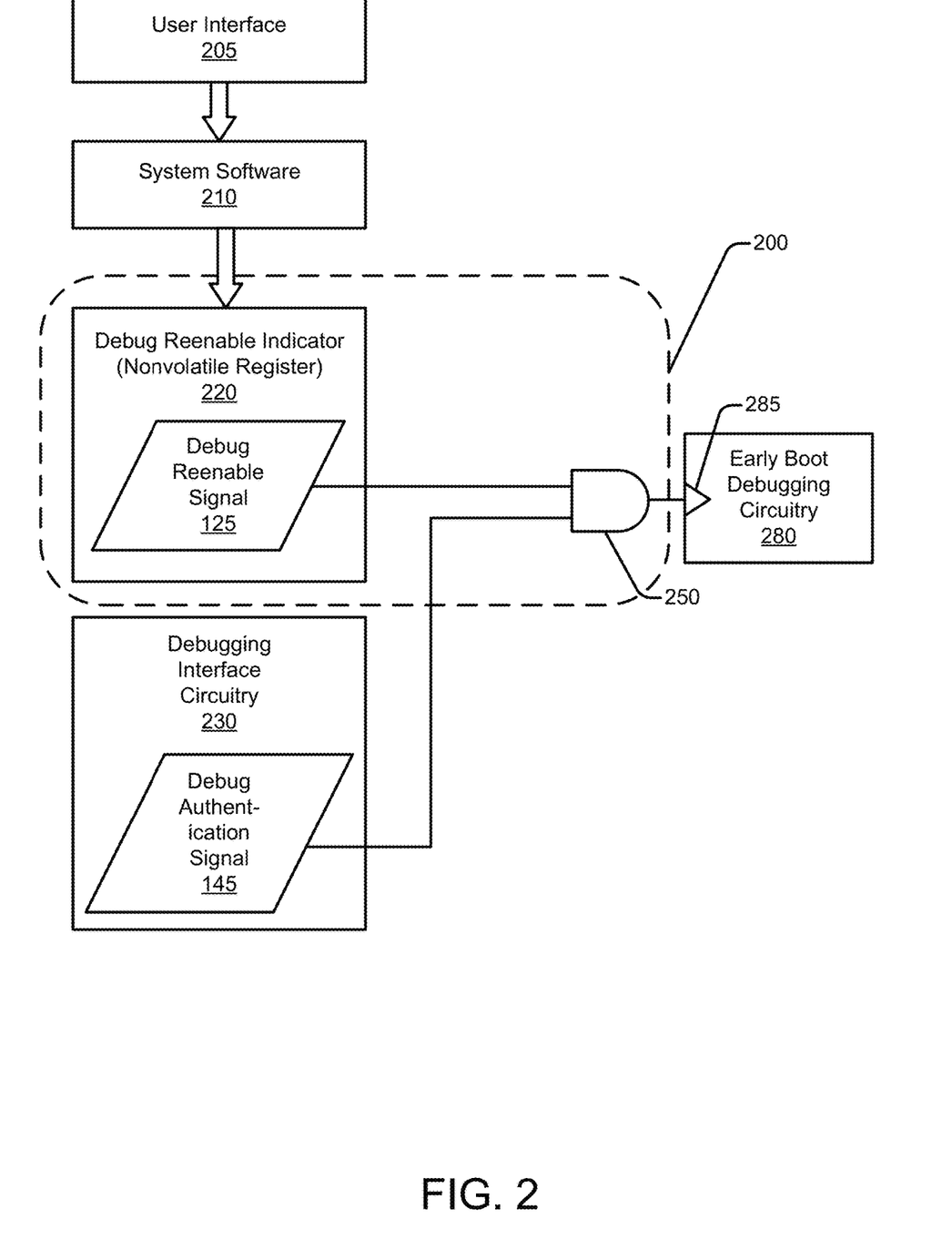
FIGS. 2 through 4 are schematic diagrams of alternative examples of the system of FIG. 1 to enable early boot debugging.

FIG. 2 illustrates an embodiment of an authorization system 200 that responds to the debug reenable signal 125 to potentially enable early boot debugging. The debug reenable signal 125 may be set by the user 105 (FIG. 1) via a user interface 205 supported by the system software 210 executing on the computing system 110 (FIG. 1). In various embodiments, with the computing system 110 booted according to an operating system and/or other system software 210, the user 105 may engage the user interface 205 to provide consent to early boot debugging upon subsequent reinitialization of the computing system 110 before the operating system and/or other system software 210 is loaded. Based on the user's consent, the debug reenable signal 125 may be set in the debug reenable indicator 220, which may include a nonvolatile storage device, status register, or other register. Because the debug reenable indicator 220 includes nonvolatile storage, the state of the debug reenable signal 125 stored in the debug reenable indicator 220 may be maintained regardless of whether the computing system 110 is powered off and/or reinitiated. For purposes of the examples of FIGS. 2-4, signals are at a high or on status once they are set, as further described below. The debug reenable indicator 220 may be reset to an unset status after early boot debugging is performed, as described further below. Although the user interface 205 and system software 210 are not shown in subsequent figures, it will be appreciated that the same or similar mechanisms also may be used to set the debug reenable signal 125 and other signals in the systems described with reference to FIGS. 3 and 4.

The authorization system 200 includes an AND gate 250 as part of the authorization logic 150 (FIG. 1). When the early debugging request 135 (FIG. 1) has been authenticated or validated by the debugging authentication system 140 (FIG. 1; not expressly shown in FIGS. 2-4), the debug authentication signal 145 is presented. Thus, when the user 105 has elected to permit early boot debugging and the early debugging request 135 has been authenticated, the debug reenable signal 125 and the debug authentication signal 145 are presented to the AND gate 250. In this example, with the user 105 giving consent to early boot debugging and an early debugging request 135 having been authenticated, if the debug reenable signal 125 and the debug authentication signal 145 are both set to a high status. Because both signals 125 and 145 are set to a high level, the AND gate 250 generates a high signal to an enable input 285 of early boot debugging circuitry 280. Thus, upon being presented with both the consent of the user 105 to early boot debugging, as manifested in the high state of the debug reenable signal 125, and that the early debugging request 135 is authorized, as manifested in the high state of the debug authentication signal 145, the authorization system 200 enables use of the early boot debugging circuitry 280 to allow testing and/or reconfiguration of the computing system 110.

Figure 3:
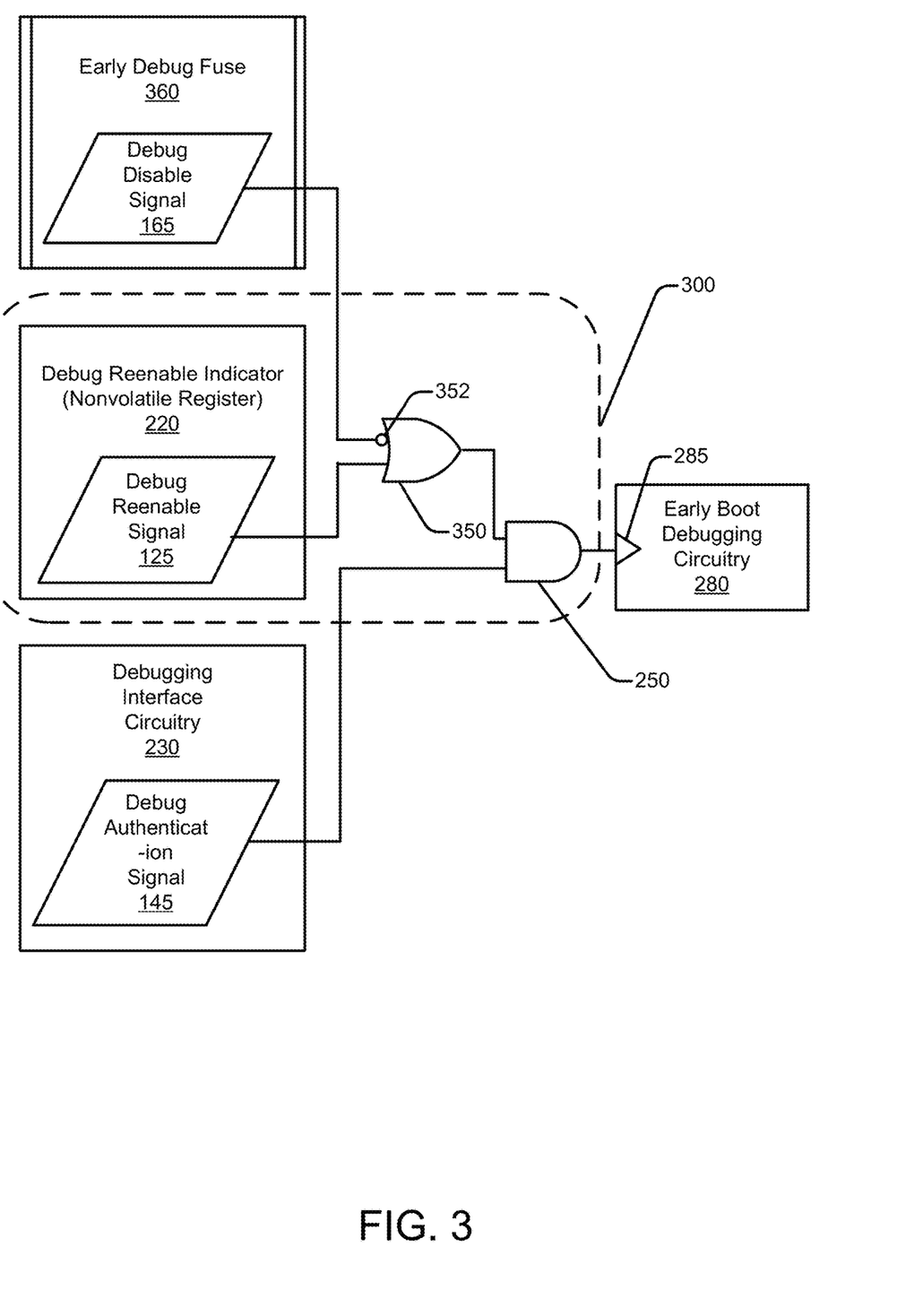

FIG. 3 illustrates an embodiment of an authorization system 300 similar to that of the authorization system 200 of FIG. 2 that enables user consent to overcome the setting of the debug disable signal 165. The authorization system 300 receives the debug disable signal 165 from an early debug fuse 360 that, for example, may be set to a low level before it is blown and set to a high level when the early debug fuse 360 is blown. Before the early debug fuse 360 is blown, the debug disable signal 165 presents a low value to the inverted input 352 of the OR gate 350. As a result, the output of the OR gate 350 provided to the AND gate 250 will be a high signal. Thus, before the early debug fuse 360 is blown, at least one high value is presented to the OR gate 350. As a result, the OR gate 350 will present a high value to the AND gate 250. As long as the debug authentication signal 145 is also high (to indicate that the early debugging request 135 is authenticated), the AND gate 250 will provide a high signal to the enable input 285 of the early boot debugging circuitry 280. Therefore, prior to blowing the early debug fuse 360, the authorization system 300 enables an authenticated early debugging request 135 to initiate early boot debugging without consent of the user.

By contrast, blowing the early debug fuse 360, as previously mentioned, may be performed in production before the computing system 110 (FIG. 1) is delivered to the user 105 (FIG. 1). With the early debug fuse 360 being blown and, for example, set to a high level, a high level signal is presented to the inverted input 352 of the OR gate 350. As a result, the output of the OR gate 350 will be a low signal presented to the AND gate 250 unless a high value of the debug reenable signal 125 is presented to the OR gate 350 to, in effect, overcome the high value of the debug disable signal 165 set in the early debug fuse 360.

In other words, once the early debug fuse 360 has been blown, the debug disable signal 165 will present a high signal to the inverted input 352 of the OR gate 350 and whether the output of the OR gate 350 is high or low will depend on whether the user 105 has consented to early boot debugging. If the user 105 has consented to early boot debugging, the debug reenable signal 125 is to a high level. When the debug reenable signal 125 is set to a high level, the OR gate 350 will provide a high signal to the AND gate 250, regardless of the state of the debug disable signal 165. Therefore, the user's consent to early boot debugging overrides the state of the debug disable signal 165 maintained by the early debug fuse 360.

Figure 4:
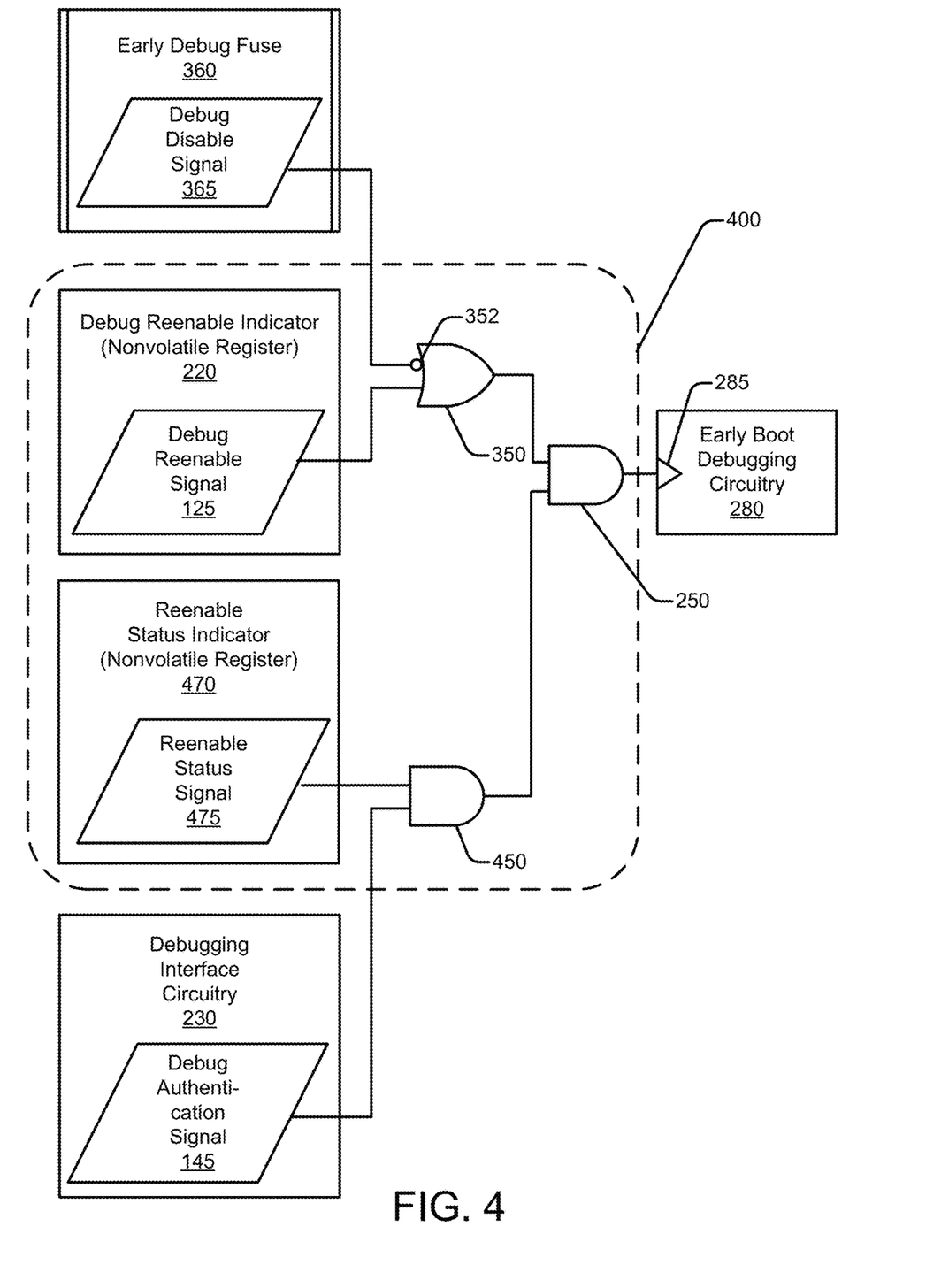

FIG. 4 illustrates an embodiment of an authorization system 400 similar to that of the authorization system 300 of FIG. 3 that enables user consent to overcome the setting of the debug disable signal 165. By contrast, however, the authorization system 400 ensures that the user provide consent each time the user wishes to consent to early boot debugging. The authorization system 400 also includes a reenable status indicator 470 in the form of a nonvolatile register or other nonvolatile storage. In various embodiments, the reenable status indicator 470 may be a one-time writable device that is reset after the value has been read. Thus, in response to the user 105 (FIG. 1) giving consent to early boot debugging, the reenable status indicator 470 is set to present the reenable status signal 475 and, after early boot debugging is performed, the reenable status indicator 470 is reset to an unset status.

In the authorization system 400, when the user 105 consents to early boot debugging via the user interface 205 and system software 210 (FIG. 2), in addition to setting the debug reenable signal 125, a reenable status signal 475 is also set in the one-time write reenable status indicator 470. The reenable status signal 475 is set to indicate that the user 105 has provided consent to early boot debugging prior to this instance of reinitiation of the computing system 110. The reenable status signal 475 is provided to an additional AND gate 450 that also receives the debug authentication signal 145. When the user 105 has consented to early boot debugging, the output of the OR gate 350 will be a high signal presented to the AND gate 250. Also when the user 105 has consented to early boot debugging upon the current reinitiation of the computing system 110, the reenable status signal 475 will be a high signal presented to the AND gate 450. When the debug authentication signal 145 indicates that the early debugging request 135 (FIG. 1) has been authenticated, the output of the AND gate 450 will be a high signal, thus, both signals to the AND gate 250 will be high signals. As a result, the AND gate 250 provides a high signal to the enable input 285 of the early boot debugging circuitry 280.

However, subsequent to initiation of the computing system 110, after the reenable status indicator 470 has been read, if the reenable status indicator is a "one-time write" device or is otherwise reset after presenting the signal it stores, the reenable status indicator 470 is reset to an unset status. Accordingly, unless the user 105 once again provides consent to early boot debugging following rebooting of the computing system 110, the reenable status indicator 470 will present a low value for the reenable status signal 475. The low value of the reenable status signal 475 will cause the AND gate 450 to present a low signal to the AND gate 250. The AND gate 250, regardless of the values of the debug reenable signal 125 or the debug disable signal 165, will provide a low signal to the enable input 285 of the early boot debugging circuitry 280, thereby preventing early boot debugging. The authorization system 400 may require that the user 105 actively provide consent prior to each instance of early boot debugging upon each reiteration of the computing system 110. This provides an additional level of security to the user 105: if the user 105 provides consent to early boot debugging once, that will not provide ongoing consent to early boot debugging until the user 105 actively turns off or withdraws consent to early boot debugging.

Figure 5A:
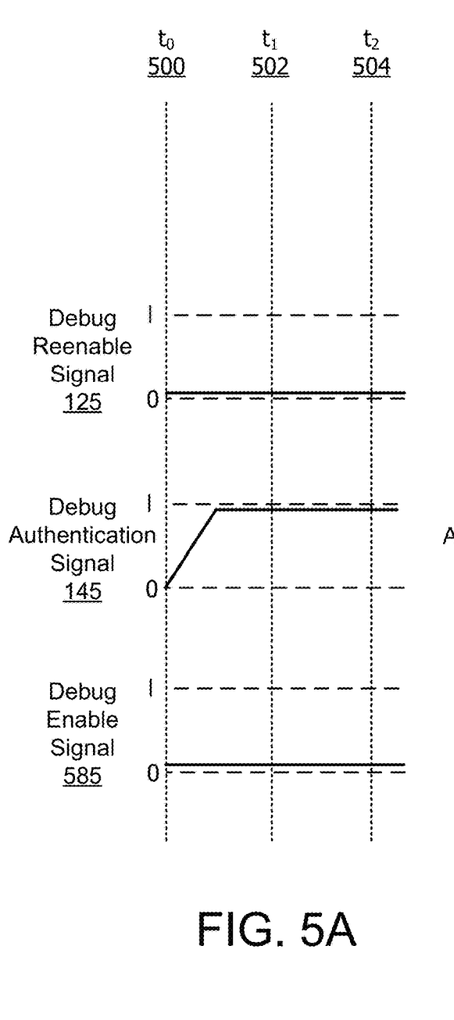
FIG. 5A, FIG. 5B, and FIG. 5C are signal diagrams to represent operation of the systems of FIGS. 2 and 3.
Figure 5B:
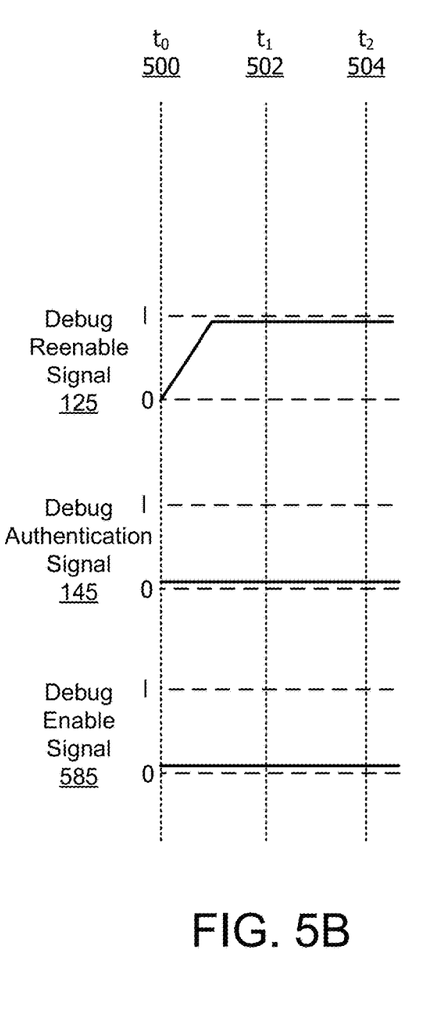
Figure 5C:
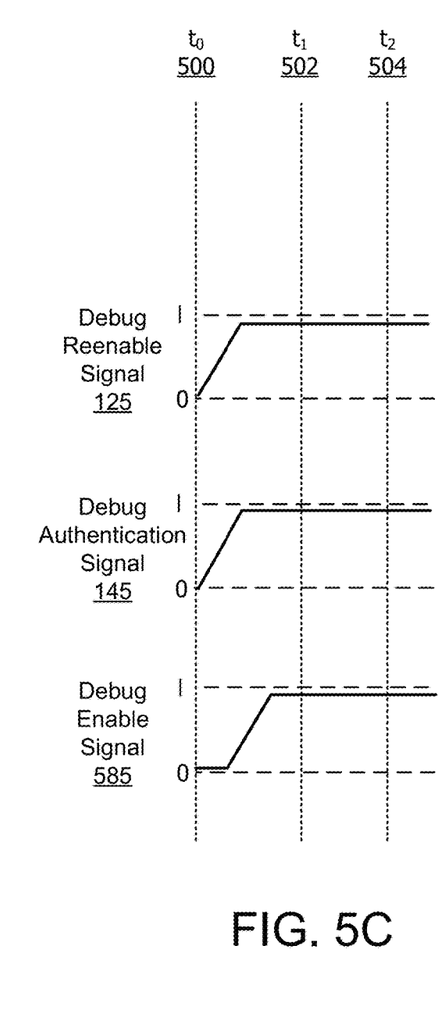

FIGS. 5A-5C graphically depict a debug enable signal 585 input to the debug enable input 285 (FIGS. 2-4) of the early boot debugging circuitry 280 (FIGS. 2-3) generated by the authorization system 200 (FIG. 2) or the authorization system 300 (FIG. 3) in response to the state of the debug reenable signal 125 (FIG. 1) and the debug authentication signal 145 (FIG. 1). In each of signal diagrams FIGS. 5A-5C, it is assumed that the early debug lock 160 (FIG. 1) or early debugging fuse 160 (FIGS. 2 and 3) has been set or blown to a disable status, as might be done before the computing system 110 (FIG. 1) is delivered to the user 105 (FIG. 1). Also, in each of signal diagrams FIGS. 5A-5C, $t_0$ 500 represents a time of initialization or reinitialization of the computing system, $t_1$ 502 represents a time at which early boot debugging becomes available (if authorized), and $t_2$ 504 represents a time after which early boot debugging has been authorized.

FIG. 5A illustrates a case in which the user 105 has not consented to early boot debugging, causing the debug reenable signal 125 to be set to a low level, as previously described. The authentication system 140 (FIG. 1) has validated an early debugging request 135 (FIG. 1), setting the debug authentication signal 145 to a high level prior to $t_1$ 502 when early boot debugging might commence. As a result, as described with reference to FIGS. 2 and 3, each of the respective authorization systems 200 and 300 generate the debug enable signal 585 at a low level. Regardless of the state of the debug authentication signal 145, because the user 105 has not consented to early boot debugging, the authorization logic 150 does not provide a high level of the debug enable signal 585, thus, the early boot debugging circuitry 280 is not enabled.

FIG. 5B illustrates a case in which the user 105 has consented to early boot debugging, causing the debug reenable signal 125 to be set to a high level. By contrast, the debug authentication signal 145 is set to a low level, presumably because the early debugging request 135 lacks the proper authentication credentials to secure authentication from the authentication system 140 (FIG. 1). Therefore, as described with reference to FIGS. 2 and 3, each of the respective authorization systems 200 and 300, generates the debug enable signal 585 at a low level at $t_1$ 502 when early boot debugging might commence. Thus, even if the user 105 consents to early hardware debugging, if the early debugging request 135 is not properly authenticated, early debugging access is blocked.

FIG. 5C illustrates a case in which the user 105 has consented to early boot debugging, causing the debug reenable signal 125 to be set to a high level. Also, the value of the debug authentication signal 145 is high, indicating that the early debug request 135 has been authenticated. Accordingly, at $t_1$ 502, each of the respective authorization systems 200 and 300 generates the debug enable signal 585 at a high level. Because the user 105 has consented to early boot debugging and the debug authentication signal 145 also is at a high level, the authorization logic 150 provides a high level of the debug enable signal 585 to the enable input 285 of the early boot debugging circuitry 280. Therefore, the early boot debugging circuitry 280 (FIGS. 2 and 3) will be enabled. In other words, early boot debugging is permitted because the user 105 has consented to early boot debugging and the early debugging request 135 has been received and authenticated.

Figure 6A:
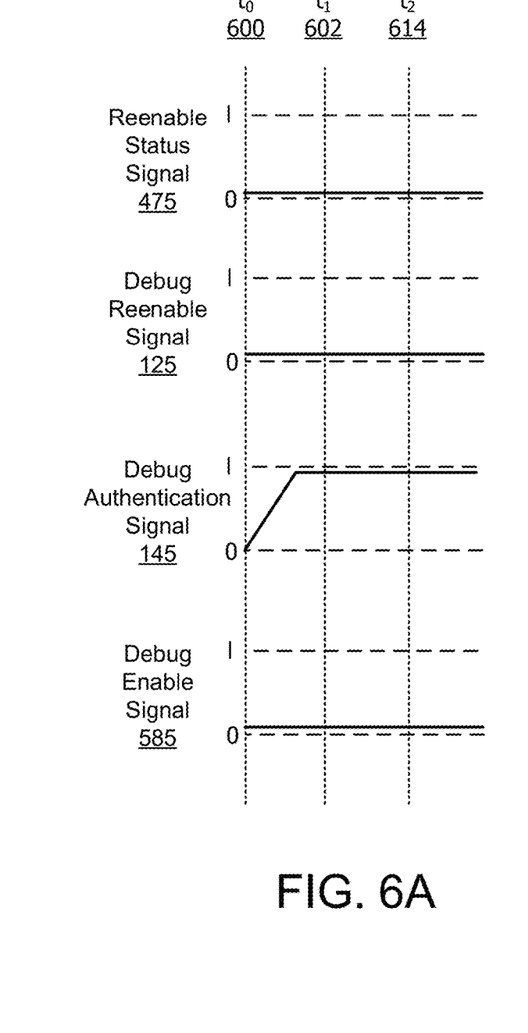
FIG. 6A, FIG. 6B, and FIG. 6C are signal diagrams to represent operation of the system of FIG. 4.
Figure 6B:
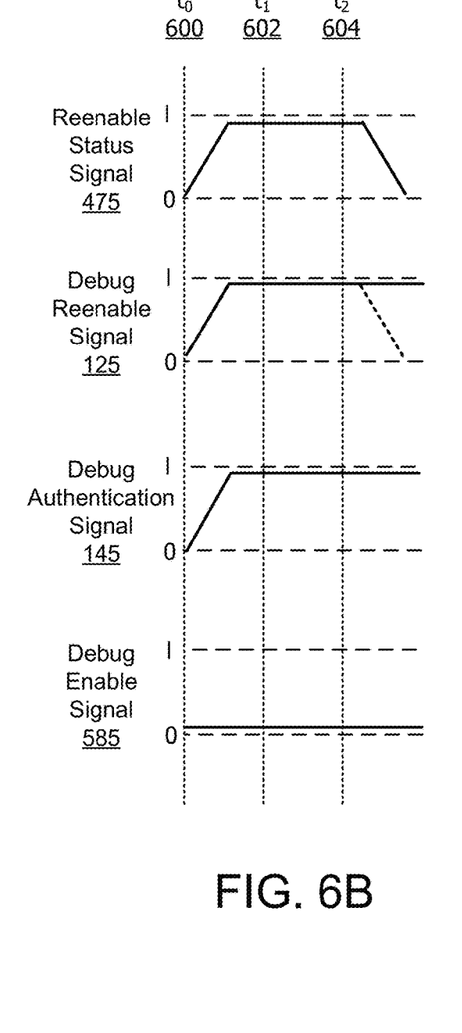
Figure 6C:
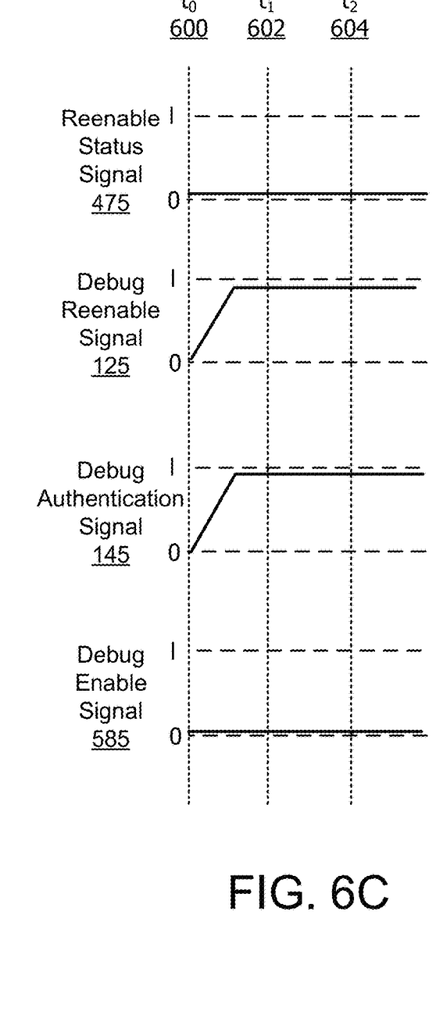

FIGS. 6A-6C graphically depict the debug enable signal 585 generated by the authorization system 400 (FIG. 4) in response to the state of the debug reenable signal 125 (FIG. 1), the debug authentication signal 145 (FIG. 1), and the reenable status signal 475 (FIG. 4). As in the examples of FIGS. 5A-5C, it is again assumed that the early debug lock 160 (FIG. 1) or early debugging fuse 160 (FIG. 4) has been set or blown to a disable status. In each of the examples of FIGS. 6A-6C, it is also assumed that the early debugging request 135 (FIG. 1) has been authenticated, resulting in the debug authentication signal 145 being set to a high level. Lastly, t0 600 represents a time of initialization or reinitialization of the computing system 110 (FIG. 1), $t_1$ 602 represents a time at which early boot debugging becomes available (if authorized), and $t_2$ 604 represents a time after which early boot debugging has been permitted.

FIG. 6A illustrates a case in which the user 105 (FIG. 1) has not consented to early boot debugging, causing the debug reenable signal 125 to be set to a low level. Correspondingly, because the user 105 has not consented to allow early boot debugging prior to initiation or reinitiation of the computing system 110, the reenable status signal 475 also is set to a low level. As a result, the authorization system 400 (FIG. 4) will generate a debug enable signal 585 at a low level because the outputs of the OR gate 350 (FIG. 4) and the output of the AND gate 450 (FIG. 4) will both be low as a result of the low level inputs presented by the debug reenable signal 125 and the reenable status signal 475, respectively.

FIG. 6B illustrates a case in which the user 105 has consented to early boot debugging prior to reinitiation of the computing system 110. As a result, the debug reenable signal 125 and the reenable status signal 475 both are set to a high level. By $t_1$ 602, the output of the OR gate 350 is at a high level because the debug reenable signal 125 is at a high level. Also, the output of the AND gate 450 (FIG. 4) will be at a high level because the reenable status signal 475 and the debug authentication signal 145 are both at high levels. Thus, the output of the AND gate 250 (FIG. 4) will be at a high level, causing the authorization system 400 (FIG. 4) to generate a debug enable signal 585 at a high level to enable the early boot debugging circuitry 280 (FIG. 4).

As previously described with reference to FIG. 4, the reenable status indicator 470 may be reset after its stored value, the reenable status signal 475 has been read. As a result, after $t_2$ 604, the value of the reenable status signal 475 maintained in the reenable status indicator 470 is reset. Accordingly, if user authorization to early boot debugging is not expressly given prior to a next reinitialization of the computing system 110 (FIG. 1), the reenable status signal 475 will be at a low value and, thus, may prevent early boot debugging. It should be noted that the debug reenable indicator 470, which includes nonvolatile storage, also may be reset after $t_1$ 602 (as represented by a dashed line in FIG. 6B) to an unset status, thereby, requiring user authorization be given to each iteration of early boot debugging.

FIG. 6C illustrates a case in which the user 105 may have consented to early boot debugging, but did not provide consent immediately prior to a next reinitiation of the computing system 110 (FIG. 1). Therefore, the debug reenable signal 125 may be at a high level, and the output of the OR gate 350 (FIG. 4) will be at a high level. However, the reenable status signal 475 will be set to a low level, causing the output of the AND gate 450 (FIG. 4) to be at a low level. Accordingly, the output of the AND gate 250 will be at a low level, causing the authorization system 400 to generate the debug enable signal 585 at a low level, thereby preventing use of the early boot debugging circuitry 280 (FIG. 4).

Figure 7:
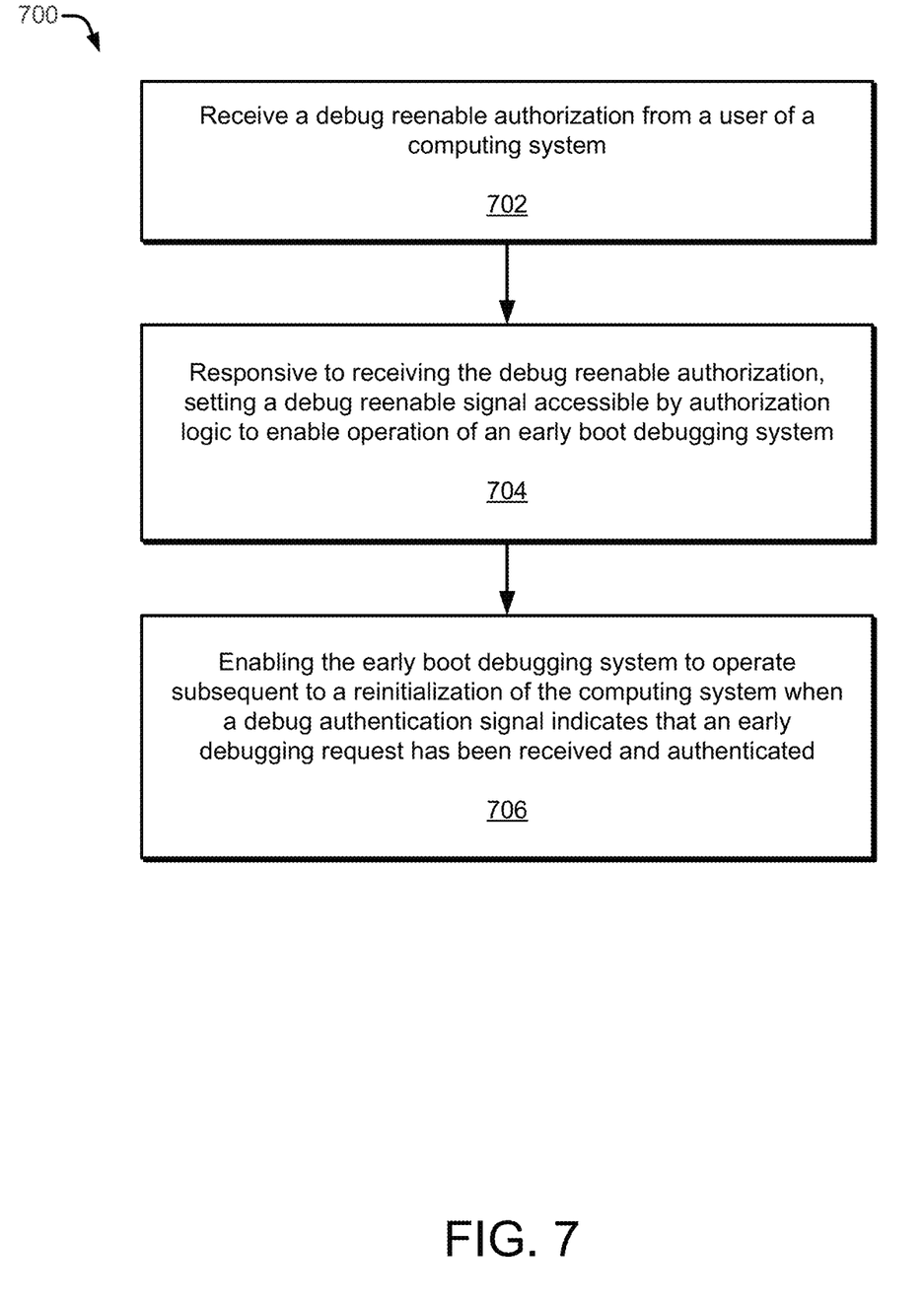
FIGS. 7 and 8 are flow diagrams of example methods of enabling early boot debugging subject to user authorization.

FIG. 7 illustrates an example method 700 that may be performed in a computing system performing early boot debug protection to include persistent user consent in accordance with one or more aspects. Operations of the method 700, described in a series of blocks 702-706, are not limited to the order or sequence as described below and, in general, may encompass various implementations of early boot protection. The method 700 may use elements of FIGS. 1-4.

At a block 702, a debug reenable authorization is received at a computing system 110 (FIG. 1) from a user 105 (FIG. 1) of the computing system. As described with reference to FIG. 2, the user 105 may engage a user interface 205 to direct the system software 210 to register the user's authorization to perform early boot debugging.

At a block 704, responsive to receiving the debug reenable authorization from the user 105, a debug reenable signal 125 (FIG. 1) is set, the debug reenable signal 125 being accessible by the authorization logic 150 (FIG. 1) configured to enable operation of an early boot debugging system 180 (FIG. 1) prior to booting of the computing system 110. As described with reference to FIG. 2, the debug reenable indicator 120 (FIG. 1) stores the debug reenable signal 125. As described with reference to FIG. 2, the debug reenable indicator 220 may include a nonvolatile storage device so that the debug reenable signal 125 persists in the computing system 110 even after a reinitiation of the computing system 110. Thus, the authorization logic 150 can access the debug reenable signal 125 following reinitiation of the computing system 110.

At a block 706, subsequent to a reinitialization of the computing system 110 and the setting of the debug reenable signal 125, when a debug authentication signal 145 (FIG. 1) indicates that an early debugging request has been received and authenticated, early boot debugging is enabled. As previously described with reference to FIG. 1, the authentication system 140 of the debugging interface 130 evaluates an early debugging request 135 presented at the debugging interface 130 and generates the debug authentication signal 145 when the early debugging request 135 is authenticated. Thus, when an early debugging request 135 is authenticated, early boot debugging may be permitted to proceed when the user's consent to early boot debugging is manifest in the debug reenable signal.

Figure 8:
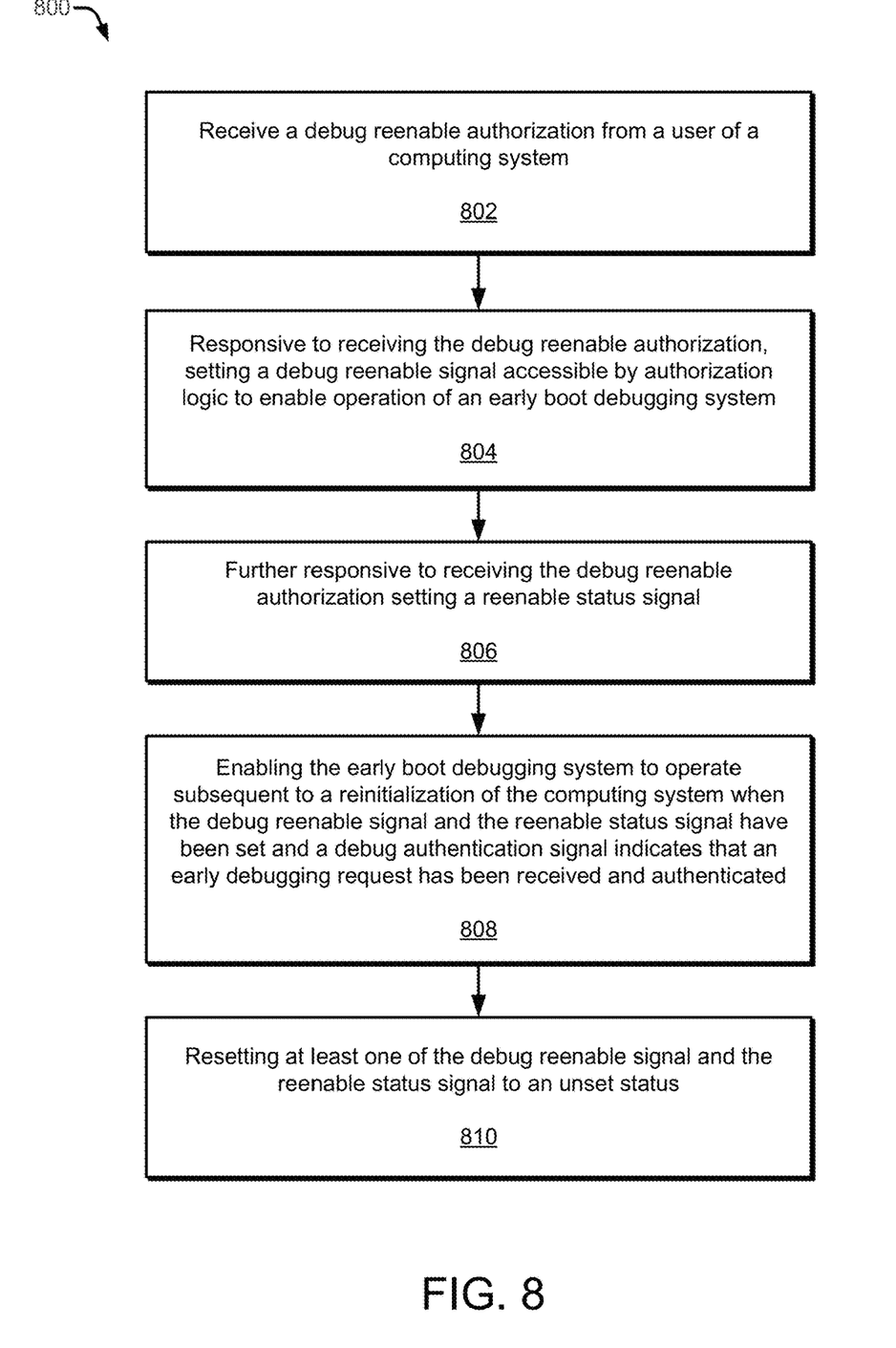

FIG. 8 illustrates another example method 800 that may be performed in a computing system performing early boot debug protection to include persistent user consent in accordance with one or more aspects. It will be appreciated that the method 800 employs use of a reenable status signal 475 that is set for a single reinitiation of the computing system 110 (FIG. 1) when the user authorizes early boot debugging, as described with reference to FIG. 4 and FIGS. 6A-6C. Operations of the method 800, described in a series of blocks 802-810, are not limited to the order or sequence as described below and, in general, may encompass various implementations of early boot protection. As is the case with method 700, the method 800 may use elements of FIGS. 1-4.

At a block 802, a debug reenable authorization is received at a computing system 110 from a user 105 (FIG. 1) of the computing system. As described with reference to FIG. 2, the user 105 may engage a user interface 205 to direct the system software 210 to register the user's authorization to perform early boot debugging.

At a block 804, responsive to receiving the debug reenable authorization from the user 105, a debug reenable signal 125 (FIG. 1) is set, the debug reenable signal 125 being accessible by the authorization logic 150 (FIG. 1) configured to enable operation of an early boot debugging system 180 (FIG. 1) prior to booting of the computing system 110. As described with reference to FIG. 2, the debug reenable indicator 120 (FIG. 1) stores the debug reenable signal 125. As described with reference to FIG. 2, the debug reenable indicator 220 may include a nonvolatile storage device so that the debug reenable signal 125 persists in the computing system 110 even after a reinitiation of the computing system 110. Thus, the authorization logic 150 can access the debug reenable signal 125 following reinitiation of the computing system 110.

At a block 806, further responsive to receiving the debug reenable authorization, a reenable status signal 475 (FIG. 4) is set. As described with reference to FIG. 4, the reenable status signal 475 may be set in a nonvolatile storage device, such as the reenable status indicator 470, to indicate that the user has set the debug reenable signal 125.

At a block 808, subsequent to a reinitialization of the computing system 110, when the debug reenable signal 125 and the reenable status signal 475 have been set and a debug authentication signal 145 indicates that an early debugging request 135 has been received and authenticated, the early boot debugging system 180 (FIG. 1) is enabled. As previously described with reference to FIG. 1, the authentication system 140 of the debugging interface 130 evaluates an early debugging request 135 presented at the debugging interface 130 and generates the debug authentication signal 145 when the early debugging request 135 is authenticated. Thus, when an early debugging request 135 is authenticated, early boot debugging may be permitted to proceed when the user's consent to early boot debugging is manifest in the debug reenable signal 125 and the reenable status signal 475 indicates that the user 105 gave consent to early boot debugging prior to reinitialization of the computing system 110 as described with reference to FIG. 4.

At a block 810, subsequent to enablement of the early boot debugging system 180, one or both of the debug reenable signal 125 and the reenable status signal 475 are reset. According to various aspects, unless the user 105 expressly provides consent to additional early boot debugging, access to the early debugging system 180 will be prevented even if an authenticated early debugging request 135 is received. Accordingly, if after early boot debugging is completed, if the user 105 does not again give consent to early boot debugging, at least one of the debug reenable signal 125 and the reenable status signal 475 are reset to an unset level, and the authorization logic 400 (FIG. 4) will not authorize access of the early boot debugging system 180.

The preceding discussion describes apparatuses and techniques for enabling a user to authorize access to early boot debugging of hardware issues in a computing system. These apparatuses and techniques may be realized using one or more of the entities or components shown in FIGS. 1-4, which may be further divided, combined, and so on. Thus, these figures illustrate some of the many possible systems or apparatuses capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for early boot debug protection leveraging persistent user consent have been described in language specific to certain features and/or methods, the subject of the appended claims is not necessarily limited to the specific features or methods described. Rather, the specific features and methods are disclosed as example implementations for early boot debug protection leveraging persistent user consent.

What is claimed is:

1. An apparatus comprising:
    a debug reenable indicator configured to maintain a debug reenable signal set by a user to authorize early boot debugging of a computing system;
    a debugging interface configured to receive a debugging request;
    a reenable status indicator configured to maintain a reenable status signal indicating that the user has set the debug reenable signal prior to a reinitialization of the computing system; and
    an authorization logic coupled to the debug reenable indicator, the debugging interface, and an early boot debugging system of the computing system, the authorization logic configured to enable the early boot debugging system subsequent to the reinitialization of the computing system responsive to the setting of the debug reenable signal and the authentication of the debugging request.

2. The apparatus of claim 1, further comprising an early debug lock including an early debug fuse configured to be permanently set to prevent enablement of the early boot debugging system responsive to the user failing to set the debug reenable signal.

3. The apparatus of claim 1, wherein the debug reenable indicator includes a nonvolatile storage device configured to maintain the debug reenable signal through a next reinitialization of the computing system.

4. The apparatus of claim 3, wherein the debug reenable indicator is configured to reset to an unset status subsequent to enabling of the early boot debugging.

5. The apparatus of claim 1, wherein the debugging interface includes a debugging authentication system configured to authenticate that the debugging request is presented by an authorized source.

6. The apparatus of claim 5, wherein the debugging authentication system includes a cryptographic authentication system.

7. The apparatus of claim 1, wherein the reenable status indicator is configured to at least one of:
    maintain the reenable status signal through a next reinitialization of the computing system; or
    reset the reenable status indicator to an unset status.

8. The apparatus of claim 7, wherein the authorization logic is configured, responsive to the reinitialization of the computing system, to enable the early boot debugging system responsive to the debug reenable indicator signal indicating that the debug reenable signal has been set and the reenable status indicator indicating that the reenable status signal has been set.

9. An apparatus comprising:
a debug reenable indicator configured to maintain a debug reenable signal set by a user to authorize early boot debugging of a computing system;
a debugging interface configured to receive a debugging request;
a reenable status indicator configured to maintain a reenable status signal through a next reinitialization of the computing system; and
an authorization logic coupled to the debug reenable indicator, the debugging interface, and an early boot debugging system of the computing system, the authorization logic configured to enable the early boot debugging system subsequent to a reinitialization of the computing system responsive to the setting of the debug reenable signal and the authentication of the debugging request.

10. The apparatus of claim 9, wherein the authorization logic is configured, responsive to the reinitialization of the computing system, to enable the early boot debugging system responsive to the debug reenable indicator signal indicating that the debug reenable signal has been set and the reenable status indicator indicating that the reenable status signal has been set.

11. The apparatus of claim 9, further comprising an early debug lock including an early debug fuse configured to be permanently set to prevent enablement of the early boot debugging system responsive to the user failing to set the debug reenable signal.

12. The apparatus of claim 9, wherein the debug reenable indicator includes a nonvolatile storage device configured to maintain the debug reenable signal through a next reinitialization of the computing system.

13. The apparatus of claim 9, wherein the debugging interface includes a debugging authentication system configured to authenticate that the debugging request is presented by an authorized source.

14. The apparatus of claim 9, wherein the reenable status indicator is configured to at least one of:
maintain a reenable status signal indicating that the user has set the debug reenable signal prior to the reinitialization of the computing system; or
reset the reenable status indicator to an unset status.

15. An apparatus comprising:
a debug reenable indicator configured to maintain a debug reenable signal set by a user to authorize early boot debugging of a computing system;
a debugging interface configured to receive a debugging request;
a reenable status indicator configured to reset the reenable status indicator to an unset status; and
an authorization logic coupled to the debug reenable indicator, the debugging interface, and an early boot debugging system of the computing system, the authorization logic configured to enable the early boot debugging system subsequent to a reinitialization of the computing system responsive to the setting of the debug reenable signal and the authentication of the debugging request.

16. The apparatus of claim 15, wherein the authorization logic is configured, responsive to the reinitialization of the computing system, to enable the early boot debugging system responsive to the debug reenable indicator signal indicating that the debug reenable signal has been set and the reenable status indicator indicating that the reenable status signal has been set.

17. The apparatus of claim 15, further comprising an early debug lock including an early debug fuse configured to be permanently set to prevent enablement of the early boot debugging system responsive to the user failing to set the debug reenable signal.

18. The apparatus of claim 15, wherein the debug reenable indicator includes a nonvolatile storage device configured to maintain the debug reenable signal through a next reinitialization of the computing system.

19. The apparatus of claim 15, wherein the debugging interface includes a debugging authentication system configured to authenticate that the debugging request is presented by an authorized source.

20. The apparatus of claim 15, wherein the reenable status indicator is configured to at least one of:
maintain a reenable status signal indicating that the user has set the debug reenable signal prior to the reinitialization of the computing system; or
maintain a reenable status signal through a next reinitialization of the computing system.

* * * * *